United States Patent

Nagan

Patent Number: 5,818,400
Date of Patent: Oct. 6, 1998

[54] DISPLAY DEVICE USING INTERSECTING OPTICAL BEAMS

[75] Inventor: Douglas A. Nagan, Deep River, Conn.

[73] Assignee: International Resource Management Inc., Essex, Conn.

[21] Appl. No.: 630,098

[22] Filed: Apr. 9, 1996

[51] Int. Cl.⁶ .................. G09G 3/00; G09G 5/00
[52] U.S. Cl. .................. 345/30; 345/6; 345/32; 345/85; 345/147; 348/59; 430/945
[58] Field of Search ................... 345/30, 139, 6, 345/147, 85, 32; 348/59; 430/945; 372/102; 365/107, 127

[56] References Cited

U.S. PATENT DOCUMENTS

| | | | |
|---|---|---|---|
| 2,604,607 | 7/1952 | Howell | 315/13 |
| 4,078,229 | 3/1978 | Swainson et al. | 365/107 |
| 4,288,861 | 9/1981 | Swainson et al. | 365/127 |
| 4,881,068 | 11/1989 | Korevaar et al. | 345/6 |
| 4,978,952 | 12/1990 | Irwin | 345/102 |
| 5,036,385 | 7/1991 | Eichenlaub | 348/59 |
| 5,040,878 | 8/1991 | Eichenlaub | 349/62 |
| 5,214,419 | 5/1993 | DeMond et al. | 345/32 |
| 5,287,096 | 2/1994 | Thompson et al. | 345/147 |
| 5,313,479 | 5/1994 | Florence | 372/26 |
| 5,394,262 | 2/1995 | Anderson | 359/196 |
| 5,410,345 | 4/1995 | Eichenlaub | 348/59 |
| 5,438,453 | 8/1995 | Kuga | 359/636 |
| 5,452,024 | 9/1995 | Sampsell | 348/755 |
| 5,453,859 | 9/1995 | Sannohe et al. | 349/9 |
| 5,506,597 | 4/1996 | Thompson et al. | 345/85 |
| 5,589,852 | 12/1996 | Thompson et al. | 345/147 |

FOREIGN PATENT DOCUMENTS

| | | |
|---|---|---|
| 2 417 822 A | 9/1979 | France . |
| 60-243641 A | 12/1985 | Japan . |
| 5-303124 | 11/1993 | Japan . |

OTHER PUBLICATIONS

International Search Report of Jul. 3, 1997, for counterpart International Application No. PCT/US97/05719.

Primary Examiner—Steven J. Saras
Assistant Examiner—Seth D. Vail
Attorney, Agent, or Firm—Morgan & Finnegan, L.L.P.

[57] ABSTRACT

A display device that includes a display medium having a planar display area over which an image is generated, a first and second optical point beam each directed in the display medium coplanar with the planar display area, and beam controllers that scan each of the optical point beams to selectively interfere in the display area within a region defined by the intersection of the optical point beams to produce an intensity in the region that has enhanced visibility relative to the individual optical beams propagating in the display medium outside of the region. The beam controller may be an elongated reflector having a reflecting surface upon which a linear array of liquid crystal modulators are controlled to selectively transmit segments of a linear beam incident on the linear array, in order to provide the optical beam by selectively reflecting segments of the linear optical beam into the display medium. The beam controllers include electronic circuitry to scan the optical beams according to a video input signal. The display device preferably employs a laser as the source of the optical point beams.

33 Claims, 6 Drawing Sheets

DISPLAY DEVICE USING INTERSECTING OPTICAL BEAMS

TECHNICAL FIELD

The present invention relates generally to displays, and more particularly, to a display device employing controlled interference of optical beams to generate an image for display.

BACKGROUND OF THE INVENTION

Two established, commercially available technologies available for displaying high information content video signals, and suited for flat-panel displays, are liquid crystal displays and gas plasma displays. Liquid crystal displays (LCDs) are widely used as flat-panel computer displays and in televisions. These LCD displays are generally active-matrix LCDs wherein each pixel is individually addressable. Active-matrix LCDs, however, have low manufacturing yields and are therefore expensive. Further, they suffer from low transmission efficiency, long response times, and low contrast ratios. In addition, for large panel applications, back-lit liquid crystal displays require a large amount of power, thereby shortening the battery life of the battery used to power the illumination of the display. Gas plasma displays, though providing high contrast, wide viewing angles, and fast response, are expensive to manufacture.

As an alternative to these established display technologies, laser-based displays have also been developed in an attempt to exploit the monochromatic nature of light directly output from the laser, the availability of high light output power lasers, as well as the ability to rapidly scan the laser beam. Laser displays operate by projecting a beam of coherent light generated by a laser onto a display medium, and deflecting the beam in order to form an image. These laser displays, however, have yet to become commercially feasible due to problems related to image flicker, laser speckle, and aligning and synchronizing multi-colored lasers to provide color images. In addition, overcoming these problems has often resulted in expensive and complex optical systems not well suited for flat-panel displays.

There remains a need, therefore, for improved display devices, and particularly, for a display device which provides low power dissipation, wide-angle viewing, low weight, flat-panel capability, illumination levels at least comparable to current flat-panel displays, large display area, and low manufacturing cost.

SUMMARY OF THE INVENTION

The present invention overcomes the above, and other, limitations by providing a display device that includes a display medium having a planar display area over which an image is generated, a plurality of optical point beams each directed in the display medium coplanar with the planar display area, and beam controllers that scan each of the optical point beams to selectively interfere in the display area within a region defined by the intersection of the optical point beams to produce an intensity in the region that has enhanced visibility relative to the individual optical beams propagating in the display medium outside of the region. The plurality of optical beams may be of different wavelengths and/or intensity in order to provide color by selectively interfering two or more such optical beams.

In a first embodiment of the invention, optical beams are derived from respective laser sources adapted to output a linear optical beam incident onto a respective controllable reflector. Each controllable reflector selectively reflects a variable segment of the linear optical beam to provide the respective optical point beams directed into the display medium, coplanar with the planar display area. Electronic circuitry is adapted to drive the controllable reflectors to scan the variable segments in accordance with a video signal.

In a second embodiment of the invention, point source beams output from respective laser sources are directly incident into respective electro-optic elements which deflect the point source beams to scan along a reflector which reflects the respective point source beams directly into, and coplanar with, the planar image display area of the display medium to provide spatially selective interference of the point sources over the planar image display area, thereby producing an image.

In a third embodiment of the invention, point source beams output from respective laser sources are directly incident into respective electro-optic elements which deflect the point source beams directly into, and coplanar with, the planar image display area of the display medium to provide spatially selective interference of the point sources over the planar image display area, thereby producing an image.

In a fourth embodiment of the present invention, linear arrays of optical point sources (e.g., lasers or light emitting diodes) are employed, each linear array providing a respective optical point beam directly into, and coplanar with, the planar image display area of the display medium. The respective laser arrays are controlled to selectively scan their respective optical point sources to provide a scanned image on the display medium. Preferably, each optical point source in each linear array may be modulated with respect to intensity, and/or wavelength to provide for a color display.

BRIEF DESCRIPTION OF THE DRAWINGS

The invention will be described in greater detail below by way of reference to the accompanying drawings, wherein.

DETAILED DESCRIPTION OF THE PREFERRED EMBODIMENT

Figure 1A:
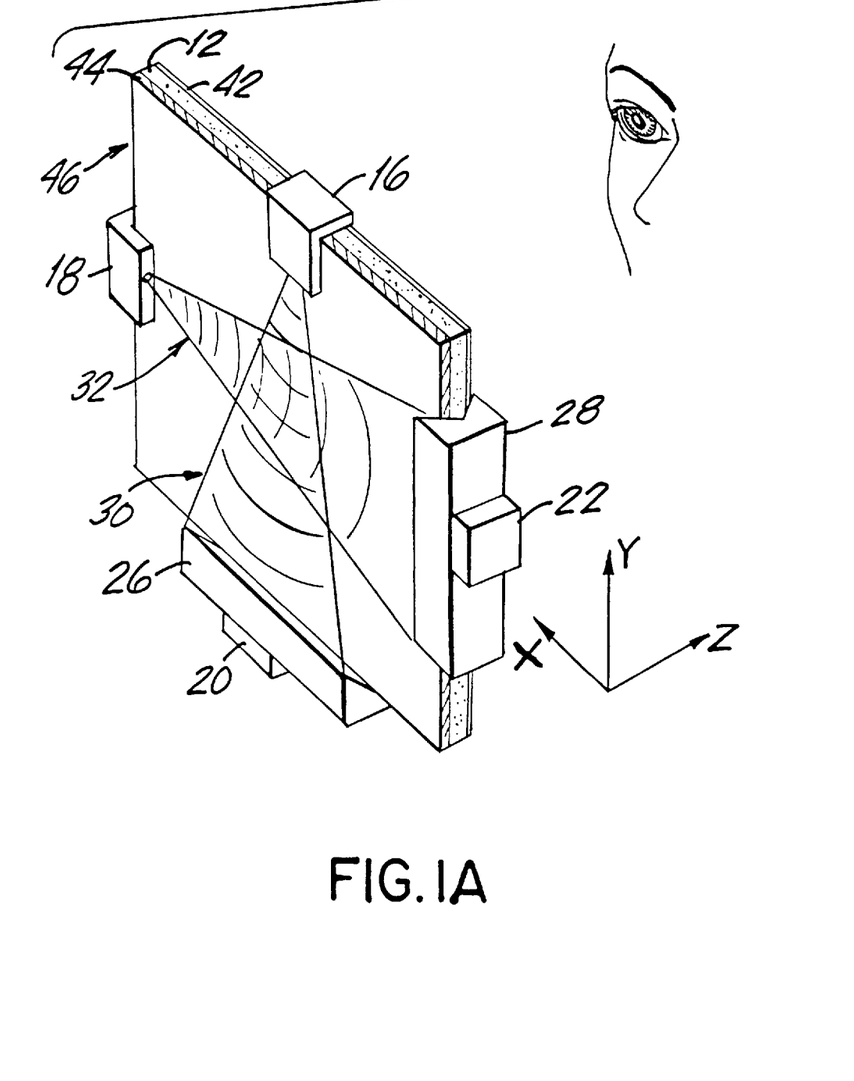
FIG. 1A is an oblique view illustrating functional components and their structural relationship for a first embodiment of a display device according to the present invention.
Figure 1B:
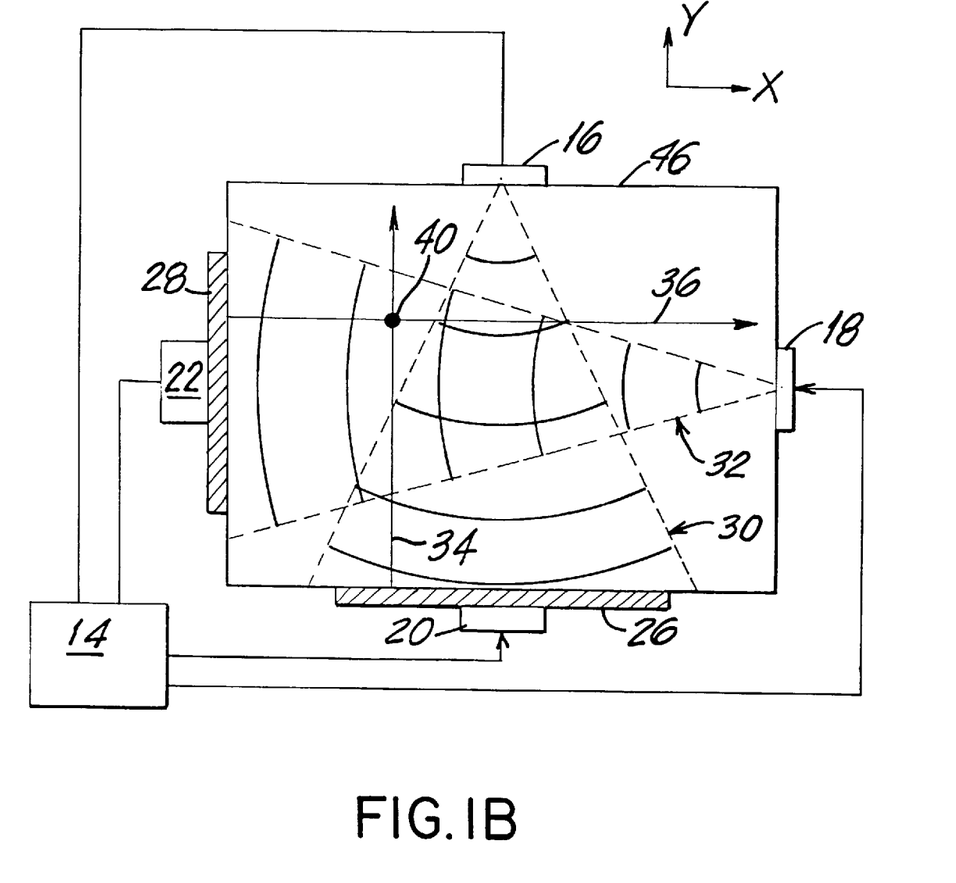
FIG. 1B is a top view illustrating functional components and their structural relationship for a first embodiment of a display device according to the present invention.

Referring to FIG. 1A and FIG. 1B, there is shown an oblique view and a top view, respectively, illustrating functional components and their structural relationship for an embodiment of a display device according to the present invention. Specifically, there is shown a display medium 12, display controller 14, laser sources 16 and 18, controlled reflectors 26 and 28, and reflector control electronics 20 and 22 which may be mounted in a housing (not shown) to provide a structural framework for the display. In operation, two coherent optical linear beams 30 and 32 emanating from respective laser sources 16 and 18 are selectively directed and scanned by reflectors 26 and 28 into display medium 12 to provide selective constructive interference on a pixel-by-pixel basis in a predetermined pattern according to control of the display controller 14.

Laser sources 16 and 18 may be implemented, for example, as Helium Neon (He-Ne) lasers operating at a nominal 632.8 nm wavelength, or as semiconductor lasers, and include any required laser control or driver circuitry. For each laser source, a lens (not shown) is coupled to each laser optical output in order to produce a linear optical beam directed onto, and along the length of, controlled reflectors 26 and 28, as schematically illustrated by linear beam 30 and linear beam 32 in FIG. 1B. It is understood that various arrangements, employing different types of light sources, and various optical elements (e.g., frequency doubling crystal, beam splitters, optical intensity modulators, optical fibers, etc.) can be implemented to provide, direct, and/or control the respective coherent radiation beams. For instance, it is understood that rather than using two laser sources, a single laser source followed by a beam splitter may be employed to provide two beams, at least one of which may be appropriately guided using optical fibers and/or mirrors before entering a line source beam generating lens. Further, it may also be understood that three laser sources having different wavelengths may be implemented in similar embodiments to those described herein, such that three optical beams of differing wavelengths and/or intensity are selectively interfered and scanned in order to provide a color image.

Controllable reflectors 26 and 28, in response to respective signals from reflector control electronics 20 and 22, selectively reflect respective segments of linear beams 30 and 32 into and along the plane of display medium 12. For clarity of exposition, FIG. 1B illustrates segments of linear beam 30 and linear beam 32 respectively reflected by controllable reflector 26 and controllable reflector 28 as point beam 34 and point beam 36, respectively. Linear beam 30 and linear beam 32 are actually not visible from a viewer's perspective, since they traverse a plane spaced away from the display medium, and are preferably blocked from view by an opaque baffle 44. Controllable reflectors 26 and 28 each can selectively provide any combination of a plurality of such point beams by selectively reflecting different segments of linear beams 30 and linear beam 32 incident thereon. Point beams 34 and 36 are essentially not visible to a viewer as they propagate through display medium 12, except for at visible intersection region 40 which is the region in which point beam 34 and point beam 36 interfere to produce an intensity visible to the viewer. The size of visible intersection point 40 represents the pixel size, and is dependent on parameters including the design of controllable reflectors 26 and 28, and any dispersion in display medium 12.

Preferably, a translucent blocking sheet 42 is disposed between the viewer and the display medium to further attenuate any background level illumination associated with the propagation of the point beams 34 and 36 through the display medium. In addition, as described hereinabove, preferably an opaque baffle sheet 44 is disposed between the display medium 12 and the plane of the linear beams 30 and 32, opposite to the viewer side, in order to shield the linear beams 30 and 32 from the viewer and to provide a backdrop for the image created by the interference of the point beams. Translucent blocking sheet 42 and/or opaque baffle sheet 44 may be implemented as being in direct contact with display medium 12 (e.g., as a coating, or by bonding) as illustrated, or as being spatially separated from display medium 12. In further embodiments, baffle sheet 44 and/or transparent blocking sheet 42 may be made from a liquid crystal material, such that each can be selectively rendered opaque or light transmissive. When the display is activated, analogous to the above description, transparent blocking sheet 42 will be made light transmissive to the extent necessary to provide contrast, and baffle sheet 44 will be rendered opaque. When the display is inactive, both transparent blocking sheet 42 and baffle sheet 44 will be made transparent so that the display may function as a window or as a frame covering a painting or portrait mounted behind and in juxtaposition with the display. Notably, such a window or frame may also be rendered opaque or variably translucent when the display is inactive by controlling either or both of blocking sheet 42 and baffle sheet 44. Such an arrangement provides for integrating display device functionality into various home and industrial designs.

Figure 2A:
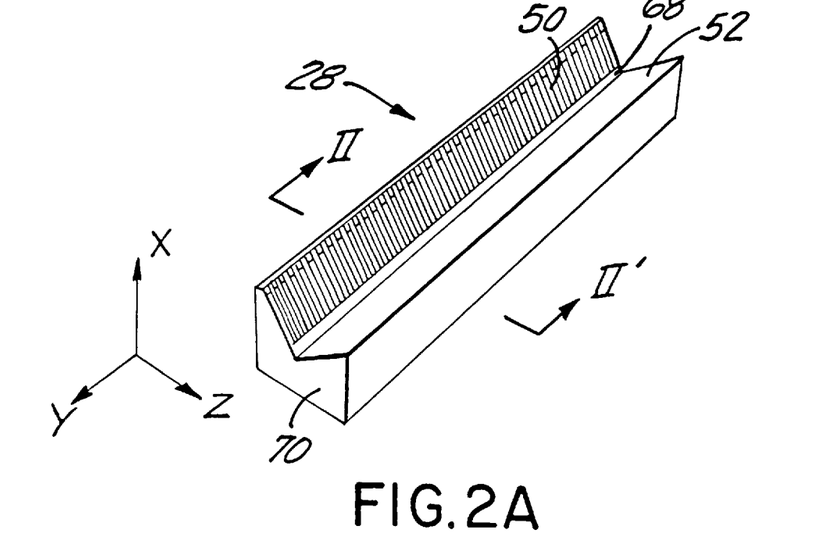
FIG. 2A illustrates a controllable reflector according to the present invention.

Various arrangements can be implemented to provide the controllable reflectors 26 and 28. For instance, FIG. 2A and FIG. 2C illustrate that the controllable reflector is constructed from an elongated substrate 70 having orthogonally oriented interior surface regions 50 and 52 along the length of controllable reflector 26. Surface regions 50 and 52 include a reflective coating 72. Surface region 50 includes a linear array of controllable transmissive elements wherein each controllable transmissive element 60 includes a liquid crystal region 62, preferably separated from the liquid crystal region 62 of an adjacent controllable transmissive element 60 by a non-reflective gap region 64, which may be formed by patterning liquid crystal material deposited on surface region 50 of elongated substrate 70 to leave a void in gap region 64, and by etching the reflective coating 72 in gap region 68 down to substrate 70. Preferably, an antireflective coating is deposited in gap region 64. Each controllable transmissive element 60 includes a separate electrical terminal 60*a* connected to a respective output from reflector control electronics 20. A common terminal 68 electrically connects an opposite end of each controllable transmissive element 60.

The relative orientation of surfaces 50 and 52 is such that a linear beam (e.g. linear beam 32) incident on surface 50 is reflected thereby onto surface 52 which in turn reflects the light such that a linear array of parallel directed point beams are reflected into the x direction of the x-y plane. Various embodiments may be implemented; for instance, each controllable transmissive element may be an appropriately oriented, separate facet (not shown) of surface region 50. Alternatively, surface region 50 may have a smooth, continuous surface which is curved (e.g., parabolic) relative to the plane of the incident linear beam and orthogonally oriented relative to surface region 52 for a given cross-section in the x-z plane.

Figure 2B:
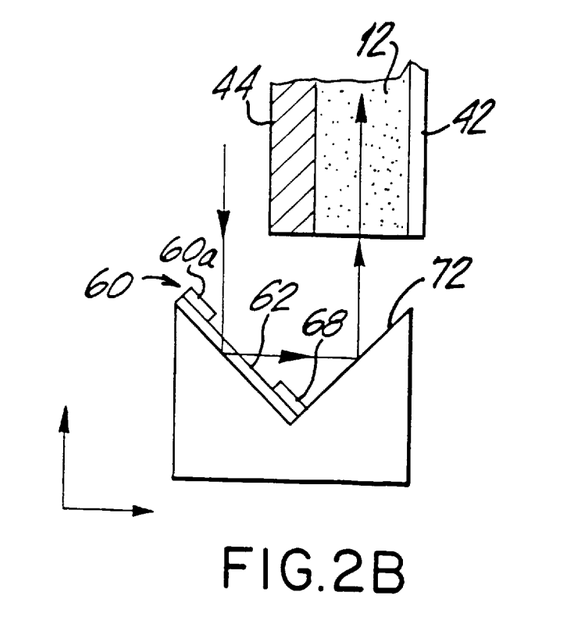
FIG. 2B depicts a cross-sectional view through a controllable transmissive element of the controllable reflector of FIG. 2A, in accordance with the present invention.
Figure 2C:
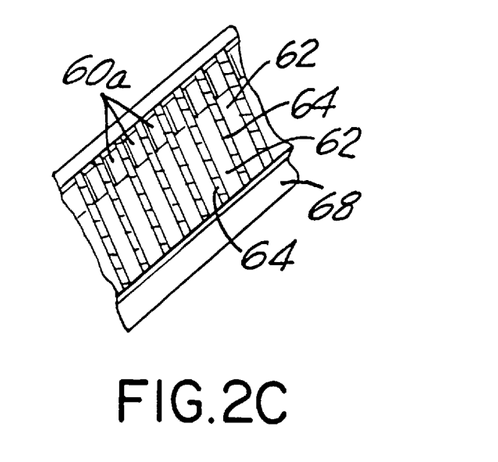
FIG. 2C is a magnified view of FIG. 2A.

As shown in FIG. 2B, which depicts a x-z plane cross-sectional view indicated by reference II–II' through a controllable transmissive element 60 of FIG. 2A, reflection of light incident on controllable transmissive element 60 (i.e., linear beam 30) by reflective coating 72 toward surface region 52 is selectively controlled by a voltage signal applied to the liquid crystal material between terminal 60a and common terminal 64. Each controllable transmissive element 60 may be operated either in a binary ON/OFF mode, or in an analog or quantized mode. Accordingly, each controllable transmissive element can selectively control the reflection of a portion of the linear beam into display medium 12, thereby providing selectively controllable linear array of point beams which are substantially parallel to each other. It is further understood that the controllable reflector shown in FIG. 2B may be instead oriented relative to the display medium such that the linear source beam is incident on surface region 52 from which it is reflected onto surface 50, which selectively reflects portions of the linear source beam into display medium 12. In such an embodiment, surface region 52 should include the appropriate curvature and/or faceting to appropriately reflect the incident linear beam onto, and along the length of, surface 50, whereas surface 52 may be planar. Such an embodiment simplifies fabrication of the controllable transmissive elements 60 on the substrate 70. Alternatively, it is understood that instead of directing the linear beams directly incident onto controllable reflectors 26 and 28, the linear beams may be passed first through a cylindrical lens in order to provide a linear, collimated beam in the x-y plane incident on the controllable reflectors 26 and 28. Accordingly, both orthogonally oriented surfaces 50 and 52 may be planar, and do not require faceting or curvature.

Figure 3A:
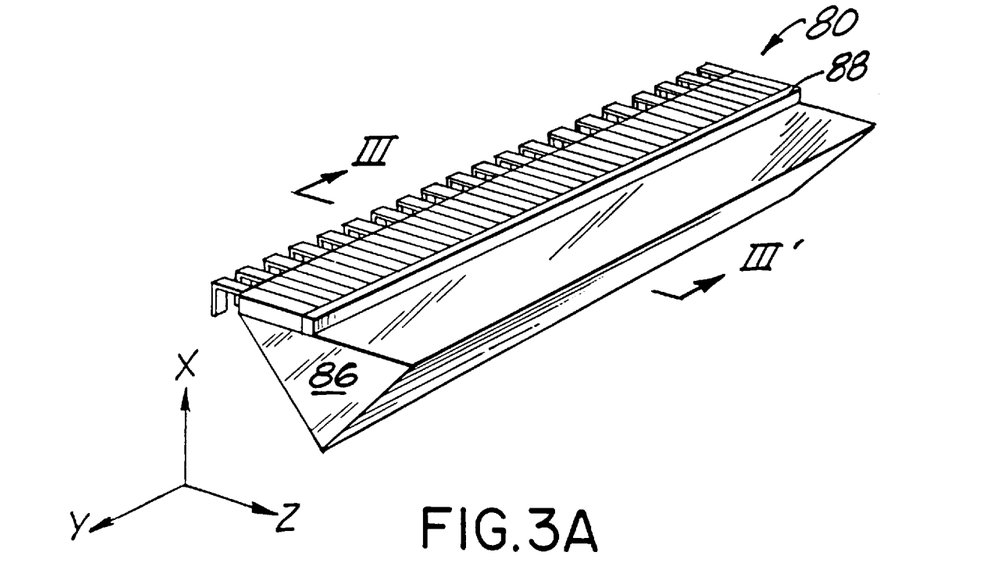
FIG. 3A illustrates an example of a variation for implementing a controllable reflector, in accordance with the present invention.
Figure 3B:
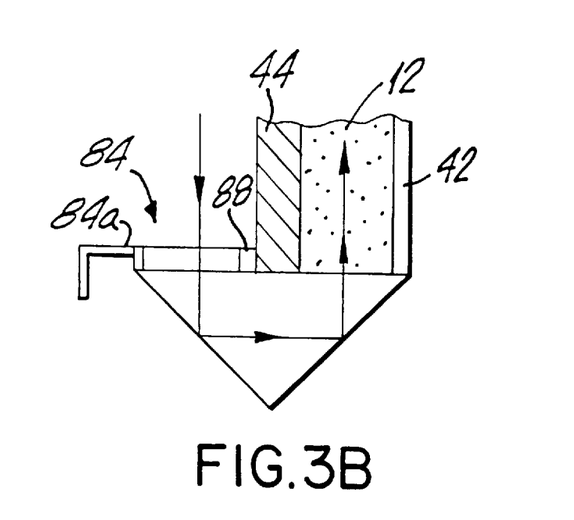
FIG. 3B depicts a cross-sectional view through a controllable transmissive element of the controllable reflector of FIG. 3A, in accordance with the present invention.
Figure 3C:
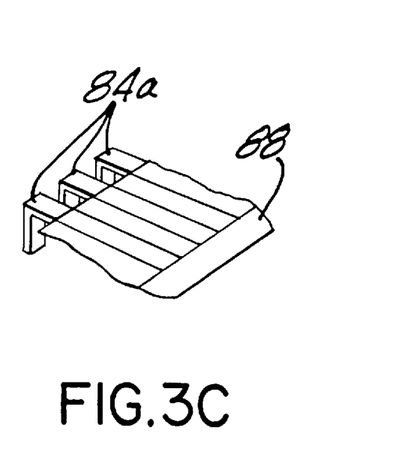
FIG. 3C is a magnified view of FIG. 3A.

FIG. 3A, FIG. 3B, and FIG. 3C illustrate an example of a variation for implementing controllable reflector 26, wherein an elongated right angle prism 86 is employed to direct light into the display medium, and a linear pixel controller 80 is positioned in the path of the incident linear beam. Linear pixel controller has segmented controllable transmissive elements 84, wherein each controllable transmissive element 84 includes a separate electrical terminal 84a connected to a respective output from reflector control electronics 20. A common terminal 88 electrically connects an opposite end of each controllable transmissive element 84. Each controllable transmissive element 84 can be turned "ON" or "OFF" to selectively block or transmit a segment of the incident linear beam to the prism 86. Preferably, each controllable transmissive element 84 may also be controlled in an analog or quantized manner to vary the intensity of the transmitted light.

Rather than employ liquid crystal materials, controlled reflection can be implemented using electro-optic and/or birefringent materials and polarizers in appropriate arrangements known to those skilled in the art. Alternatively, the controllable reflector can be implemented as a linear array of micromirrors that are each mechanically movable in response to an electric field which is selectively controlled by a transistor element for each micromirror. The fabrication and design of such micromirror devices are disclosed in numerous patents, including U.S. Pat. Nos. 4,441,791, 4,710,732, 4,596,992, 4,615,595, 4,662,746, 5,061,049, and 5,287,096, which are herein incorporated by reference.

In addition, it is understood that intensity modulation mechanism may be employed by the controllable transmissive elements themselves (as described above), by a separate intensity modulation mechanism/device, or by modulating the lasers, or a combination thereof.

Display controller 14 receives an input signal indicative of the image to be displayed (e.g., an analog video signal or a digital video signal), and provides appropriate signals to reflective controllers 20 and 22, and optionally also to laser sources 16 and 18, as required depending on the application. Depending on the application, display controller 14 receives either an analog or digital signal representative of the image to be displayed. In its basic form, display controller 14 maintains synchronization and timing for reflective controllers 26 and 28, and the display signal is provided to one or both of reflective controllers 26 and 28, and/or to laser sources 16 and 18, depending on whether one or both controllers, or one or both laser sources, are employed to modulate the optical intensity of the respective optical paths. In applications where the intensity is modulated for values in addition to (and between) "ON" (i.e., light) and "OFF", display controller 14 provides a signal for such intensity modulation to the laser and/or to an electro-optic or liquid crystal element through which one or both of the optical paths traverse. For instance, applying a variable voltage level to each selected liquid crystal controllable transmissive element of reflector pixel controller of FIG. 2A, will provide such variable intensity modulation instead of simply switching between ON and OFF.

Reflector control electronics 20 and 22 control and drive each controllable transmissive element 60 of each controllable reflector 26 and 28. Various control arrangements can be implemented to control controllable reflector 26 relative to controllable reflector 28 in order to produce an image or display. For instance, for a frame rate of F and for n and m controllable transmissive pixels contained in controllable reflectors 26 and 28, respectively, to provide conventional rastering, each successive controllable transmissive element of controllable reflector 26 is selected at a frequency mF, and each successive controllable transmissive element of controllable reflector 28 is selected at a frequency mnF. When each reflective element is selected, it is provided either with an "ON" voltage level or an "OFF" voltage level; if continuous or multiple-level quantized intensity modulation is employed via the controllable reflectors, then some voltage value ranging between "ON" and "OFF" is provided to the selected controllable tranmissive element. Logically, this may be implemented by a counter providing a selection signal to an analog demultiplexor having an input representing the intensity voltage level and having a separate output for each controllable transmissive element. It is understood that only one of the controllable reflectors, preferably controllable reflector 28, need have ON/OFF or intensity modulation, and the other controllable reflector can be continuously scanned in an "ON" condition. Rather than sequentially scanning the reflective elements, an interlaced scanning technique may be employed.

Display medium is formed from a material, such as a plastic or an aerogel, which is substantially transmissive of the coherent light. Aerogels are amorphous materials having pore sizes which are on the order of the wavelength of visible light, and therefore, provide substantial optical transmission at these wavelengths with insubstantial scattering. The aerogel may be doped (e.g., the entire aerogel, or a planar portion, or alternatively the back surface may be coated or patterned) with a gain providing material, such as a rhodamine dye, in order to provide intensity gain for excitation by incident radiation from two optical beams interfering in the display medium in or near the gain providing material relative to the response to incident radiation of a single optical beam traversing the display medium in or near the gain providing material.

Figure 4:
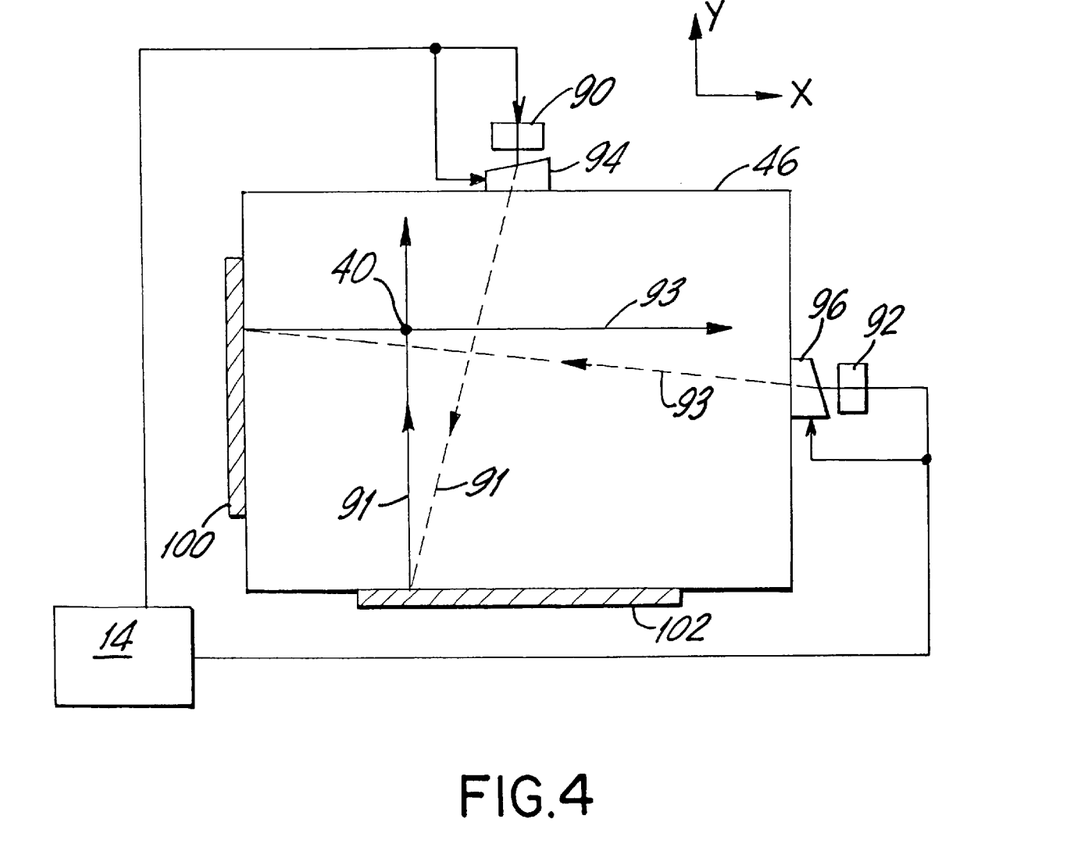
FIG. 4 illustrates a second embodiment of a display device according to the present invention.

FIG. 4 illustrates another embodiment of the present invention, wherein the beams emanating from laser source 90 and laser source 92 are directly scanned across reflectors 100 and 102. Specifically, instead of producing linear source beam, a point source beams 91 and 93 emanate from the respective lasers. Electro-optic refracting elements 94 and 96 are employed to scan the point beams 91 and 93 over the reflectors 100 and 102, which reflect the respective point beams into and in the plane of the display medium 12 where they intersect and interfere to provide a visible intersection point 40. It is noted that the segments of point beams 91 and 93 between the refracting elements 94, 96 and the reflectors 100, 102 (indicated by the dashed line in FIG. 4) traverse a path spaced away from display medium 12 such that these segments of point beams 91 and 93 are blocked from view by baffle sheet 44. Additional intensity modulation may be provided by including separate optical modulators (not shown) under control of display controller 14. Reflectors 100 and 102 are structurally similar to controllable reflectors 26 and 28 of FIGS. 1A–2B, but since a focussed beam is scanned, reflectors 100 and 102 may be passive (i.e., do not require controllable transmissive elements). Accordingly, one surface may either include a series of reflective elements separated by non-reflective (e.g., anti-reflective or non-specular reflecting) gaps, or both surfaces may be continuously reflective surfaces. These reflectors may, however, alternatively include controllable transmissive elements to further modulate the beam intensity, if desired.

Figure 5:
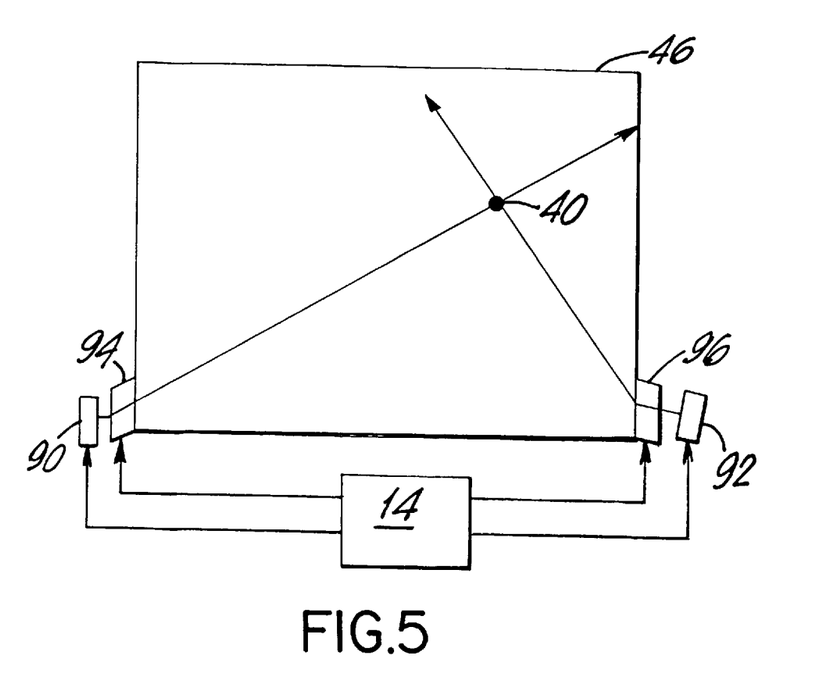
FIG. 5 illustrates a third embodiment of a display device according to the present invention.

FIG. 5 illustrates another embodiment of the present invention, wherein the respective point source beams output from laser sources 90 and 92 are directly incident into the display medium 12. Electro-optic refracting elements 94 and 96 are employed to scan the beams in the x-y plane of the display medium 12. Controller 14 provides the appropriate drive signal to the electro-optic refracting elements 94 and 96 in order to provide a raster scan of the visible intersection point 40 within the display medium 12 to produce an image. Compared to the embodiment of FIG. 4, no reflectors are required since, as described, the scanned point beams are directly incident into the display medium 12.

Figure 6:
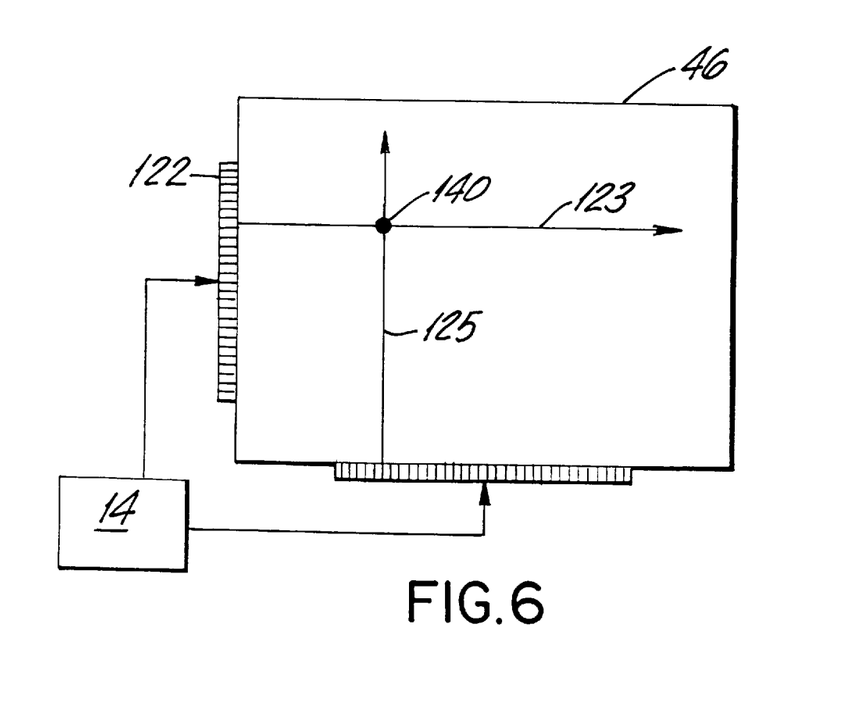
FIG. 6 illustrates a fourth embodiment of a display device according to the present invention.

FIG. 6 illustrates an alternative embodiment of the present invention, wherein linear laser arrays 122 and 124 are employed. Each laser array includes a separate laser (not shown) for each point beam directed into display medium 12 by the laser array. For instance, a display having a resolution of 640 by 400 pixels would employ two orthogonally oriented linear arrays having 640 laser sources and 400 laser sources, respectively. The optical point beams output by the laser arrays are directly incident into, and coplanar with, the display medium. As shown, laser array 122 provides point beam 123 which interferes with point beam 125 generated by laser array 124 to provide a visible intersection point 40. Preferably, each laser in each laser array 122 and 124 may be modulated with respect to intensity and/or wavelength, and the respective laser arrays 122 and 124 are controlled by display controller 14 to provide a raster scanned image on display medium 12. Accordingly, although the embodiment of FIG. 6 requires linear laser arrays, it requires neither controllable reflectors such as those of FIG. 2 nor beam steering mechanisms such as the controllable refractor of FIGS. 4 and 5. In accordance with the present invention, and consonant with the alternative embodiments set forth hereinabove, it may also be understood that more than two optical beams may be interfered in the display medium. For example, three linear arrays, each linear array characterized by a different wavelength of light for its optical sources, may be employed to provide color mixing for a color display.

Although the above description provides many specificities, these enabling details should not be construed as limiting the scope of the invention, and it will be readily understood by those persons skilled in the art that the present invention is susceptible to many modifications, adaptations, and equivalent implementations without departing from the spirit and the scope of the invention and without diminishing its attendant advantages. It is therefore intended that the present invention is not limited to the disclosed embodiments but should be defined in accordance with the claims which follow.

We claim:

1. A display device, comprising:

a display medium having a planar display area over which an image is produced;

a first reflector element that directs a first optical point beam within said display medium along a first optical path according to a first control signal said first optical path lying in a plane which is coplanar with said planar display area;

a second reflector element that directs a second optical point beam within said display medium along a second optical path according to a second control signal, said second optical path lying in a plane which is coplanar with said planar display area, said first and second optical paths thereby defining a plane which is coplanar with said planar display area;

an optical source that generates a first optical beam projected in a plane that is parallel to said planar display area and is adjacent to and separated from said display area in a direction normal to said planar display area, and wherein said first optical beam is incident on said first reflector element which reflects at least a portion of said first optical beam to provide said first optical point beam; and wherein said first and said second optical point beams interfere within said display medium in a region defined by the intersection of said first and second directions to produce an intensity in said region that has enhanced visibility relative to said first optical beam or said second optical beam along said first and second directions, respectively, outside of said region within said display medium.

2. The display device according to claim 1, wherein said display medium is an aerogel.

3. The display device according to claim 1, wherein said first or second reflector element is a controllable reflector which includes a liquid crystal optical modulator or switch.

4. The display device according to claim 1, wherein said optical beam incident onto said first reflector element is a linear optical beam, and wherein said first reflector element is a controllable reflector upon which said linear optical beam is incident, and which selectively reflects a segment of said linear optical beam to provide said first optical point beam.

5. The display device according to claim 4, wherein said controllable reflector includes a first reflective surface and a second reflective surface, said first reflective surface having a linear array of liquid crystal optical modulators that are each controlled to selectively transmit or block a respective segment of said linear optical beam.

6. The display device according to claim 4, wherein said controllable reflector modulates said first optical point beam to provide a range of intensity values for said first or second optical point beams.

7. The display device according to claim 4, wherein said optical source is controlled to provide a variable intensity of said linear optical beam.

8. The display device according to claim 4, wherein said controllable reflector includes a linear array of micromirrors that selectively reflect respective segments of said linear optical beam into the display medium.

9. The display device according to claim 4, wherein said optical source includes a laser that emits a point source of light, and a means for generating said linear beam from said point source of light.

10. The display device according to claim 1, further comprising a baffle sheet disposed between said optical beam and said display medium and which is capable of attenuating optical radiation of said optical beam, thereby forming an optical attenuation barrier between the plane of said optical beam and said planar display area.

11. The display device according to claim 10, wherein said baffle sheet is opaque.

12. The display device according to claim 10, wherein said baffle sheet has a transmissivity that is capable of being controlled between opaque and transparent, inclusively.

13. The display device according to claim 10, wherein said baffle sheet is in direct contact with said display medium.

14. The display device according to claim 1, wherein said optical source generates a second optical beam, said second optical beam projected in a plane that is parallel to said planar display area and is adjacent to and separated from said display area in a direction normal to said planar display area, and wherein said second optical beam is incident on said second reflector element which reflects at least a portion of said second optical beam to provide said second optical point beam.

15. The display device according to claim 14, wherein said optical source includes a single laser source and a beam splitter to provide said first optical beam and said second optical beam.

16. The display device according to claim 14, wherein said optical source includes a first laser source to provide said first optical beam, and a second laser source to provide said second optical beam.

17. The display device according to claim 1, further comprising a display control circuit that generates said first control signal and said second control signal.

18. The display device according to claim 1, wherein said optical source includes a linear array of individually selectable optical point sources to provide said first optical beam.

19. The display device according to claim 1, wherein said optical source includes a laser that emits said first optical beam as a point source of light which is scanned along and incident onto said first reflector element which outputs said first optical beam as a reflection of said first optical beam.

20. The display device according to claim 19, wherein said optical source includes a beam steering means for scanning said first optical beam output from said laser along said first reflector element in response to said first control signal.

21. The display device according to claim 1, wherein said first and second optical point beams each are coherent light.

22. The display device according to claim 21, wherein said first and second optical point beams are each monochromatic.

23. A display device, comprising:
    a first optical point beam;
    a second optical point beam;
    a display medium having a planar display area over which an image is produced;
    a first optical beam controller that directs said first optical point beam within said display medium, coplanar with said planar display area, along a first direction according to a first control signal;
    a second optical beam controller that directs said second optical point beam within said display medium, coplanar with said planar display area, along a second direction according to a second control signal;
    a translucent blocking sheet adjacently disposed and coplanar with said display medium; and
    wherein said first and said second optical point beams interfere in a region defined by the intersection of said first and second directions to produce an intensity in said region that has enhanced visibility relative to said first optical beam or said second optical beam along said first and second directions, respectively, outside of said region; and
    wherein said translucent blocking sheet attenuates said first and second optical beams such that said intensity in said region has enhanced visibility relative to said first optical beam or said second optical beam along said first and second directions, respectively, outside of said region.

24. The display device according to claim 23, wherein said translucent blocking sheet has a transmissivity that is capable of being controlled between opaque and transparent, inclusively.

25. The display device according to claim 23, wherein said translucent blocking sheet is in direct contact with said display medium.

26. A display, comprising:
    a display medium having a planar display area over which an image is produced;
    means for generating a first optical beam and a second optical beam, and for projecting said first and second optical beams along optical paths lying in a plane parallel to said planar display area, and adjacent to and separated from said planar display area in a direction normal to said planar display area;
    means for reflecting said first and second optical beams for providing a first optical radiation point source and a second optical radiation point source;
    means for scanning each of said first and second optical radiation point sources in and coplanar with said planar display area to selectively interfere said first and second optical radiation point sources in said display medium to produce an image.

27. The display according to claim 26, wherein said means for generating first and second optical beams includes a linear array of individually selectable optical point sources.

28. The display according to claim 26, wherein said first and second optical beams are each linear beams, and wherein said means for reflecting includes means for selectively reflecting a portion of each said linear beam to provide said first and second optical radiation point sources.

29. The display medium according to claim 26, wherein said means for generating and projecting said first and second optical beams includes means for generating said first and second optical beams as point beams, and means for scanning said point beams along said means for reflecting.

30. A display device, comprising:
    a first optical point beam;
    a second optical point beam;
    a non-gaseous display medium having a planar display area over which an image is produced;

a gain providing medium disposed in or adjacent said planar display area;

a first optical beam controller that directs said first optical point beam within said display medium, coplanar with said planar display area, along a first direction according to a first control signal;

a second optical beam controller that directs said second optical point beam within said display medium, coplanar with said planar display area, along a second direction according to a second control signal; and wherein said first and said second optical point beams interfere in a region defined by the intersection of said first and second optical paths to excite said gain providing material to produce an intensity in or adjacent said region that has enhanced visibility relative to said first optical beam and said second optical beam individually along said first and second optical paths outside of said region and within said display medium.

31. The display device according to claim 30, wherein said display medium is doped with said gain providing material.

32. The display device according to claim 30, wherein said gain providing material is patterned.

33. The display device according to claim 30, wherein said gain providing material is formed as a coating on said display medium.

* * * * *